(12) United States Patent
Behrens et al.

(10) Patent No.: US 7,970,592 B2
(45) Date of Patent: *Jun. 28, 2011

(54) SYSTEM AND METHOD FOR CONSENSUS-BASED KNOWLEDGE VALIDATION, ANALYSIS AND COLLABORATION

(76) Inventors: Clifford A. Behrens, Madison, NJ (US); Hyong-sop Shim, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,537

(22) Filed: Oct. 29, 2009

(65) Prior Publication Data

US 2010/0305915 A1 Dec. 2, 2010

Related U.S. Application Data

(63) Continuation of application No. 11/218,015, filed on Sep. 1, 2005, now Pat. No. 7,630,867.

(60) Provisional application No. 60/606,571, filed on Sep. 1, 2004.

(51) Int. Cl.
*G06F 17/50* (2006.01)
(52) U.S. Cl. ............ 703/2; 702/179; 702/183; 702/188; 702/618
(58) Field of Classification Search ...... 703/2; 702/179, 702/183, 188, 186
See application file for complete search history.

(56) References Cited

U.S. PATENT DOCUMENTS

| 6,292,830 | B1 | 9/2001 | Taylor et al. |
| 6,795,793 | B2 | 9/2004 | Shayegan et al. |
| 7,181,365 | B2 * | 2/2007 | Inoue et al. .................. 702/183 |
| 7,299,110 | B2 | 11/2007 | Gupta et al. |
| 7,590,548 | B2 | 9/2009 | Meyer et al. |
| 7,630,867 | B2 | 12/2009 | Behrens et al. |
| 2005/0004823 | A1 | 1/2005 | Hnatio |

* cited by examiner

*Primary Examiner* — Thai Phan
(74) *Attorney, Agent, or Firm* — Fitch, Even, Tabin & Flannery

(57) ABSTRACT

A consensus-based knowledge validation and analysis system provides a way to increase use of collaboration tools among panels of experts by providing a system for analyzing and validating the responses of such experts to a set of questions. The system uses a set of response data input by a panel of experts with respect to a particular subject matter formatted in accordance with a data model as input. The response data set is used to estimate an empirical point estimate matrix indicative of the amount of agreement in the responses on all items between the panelists. The empirical point estimate matrix is used to estimate the saliency of the subject matter to panelists, the competency of each panelist and a consensus model of correct answers is based on the estimated competency of each panelist and the of responses for each item in the response data set. This consensus model is used to generate a knowledge map to aid visualization of the consensus data and encourage further collaboration and consensus building. The method is implemented in a web-based system that enables users of collaboration tools to send response data sets to the tool via the Internet or virtual private network and to likewise retrieve knowledge maps, panelist information and consensus data. An interactive feature enables users/panelists to collaborate with other panelists using the knowledge map as an interface to one or more collaboration tools such as instant messaging.

10 Claims, 9 Drawing Sheets

SYSTEM AND METHOD FOR CONSENSUS-BASED KNOWLEDGE VALIDATION, ANALYSIS AND COLLABORATION

CROSS-REFERENCE TO RELATED APPLICATIONS

This application is a continuation of U.S. patent application Ser. No. 11/218,015, filed Sep. 1, 2005, now U.S. Pat. No. 7,630,867 which claims the benefit of the filing date of U.S. Provisional Patent Application No. 60/606,571, filed Sep. 1, 2004, which applications are incorporated by reference for all purposes and from which priority is claimed.

FIELD OF THE INVENTION

This invention relates generally to a method and system for providing knowledge validation and analysis of response data gathered from panels of experts. More particularly, the invention relates to a method and system for providing web-based consensus-based knowledge validation and analysis by processing information acquired from human collaborators in order to leverage knowledge and its distribution among expert panelists to facilitate and motivate use of available collaboration tools.

DESCRIPTION OF THE BACKGROUND

Recently, the intelligence community has moved aggressively to develop new IT infrastructures that make better use of their domain expertise to counter terrorism. These infrastructures include sophisticated modeling tools which are being deployed in computer-based collaboration environments to facilitate information exchange so that experts can incrementally improve their models as new information becomes available. While these infrastructures have the potential to improve the quality of intelligence produced by expert panels, and increase the speed at which it is produced, much of this potential has yet to be realized. This is mostly due to the fact that there is little effort to provide useful metrics for validating the quality of experts and the models they produce. Moreover, collaboration facilities mostly remain under-utilized and thus ultimately prove ineffective, largely due to the current lack of integration between information analysis/modeling tools and collaboration tools. This makes using collaboration tools "extra work" rather than routine, and often leads to undesirable situations where analysts are mostly unaware of each other's work, knowledge, and expertise. Hence, there is little motivation for them to proactively seek advice, initiate communication and collaborate.

During the last two decades there has been a significant increase in the research and development in the field of Computer Supported Cooperative Work (CSCW). Enthusiasm over the potential of collaboration technologies has caused some to deploy these as a means to improve knowledge creation and management in their work environment. For example, the Groove system was selected as a collaboration environment for a significant DARPA funded R&D program. The Groove system was developed by Groove Networks, Inc. (recently acquired by Microsoft, Corp.) and is described in Groove Virtual Office: Product Backgrounder (2005). As more of this type of "collaboration ware" becomes deployed in mission critical applications it becomes increasingly important not only for it to be used, but used effectively.

CSCW research has tended to focus on the production of new collaboration tools without concurrently developing new technologies to motivate their use. Some of this motivation might be provided by giving users greater insight into how knowledge is distributed within their work environments along with new communications interfaces, which, based on this insight, facilitate interactions between those who possess and those who need knowledge. This perspective is a departure from many process-based collaboration approaches designed to enforce prescribed work flows. Rather, a more flexible and informal knowledge-based approach is needed where collaboration grows out of a heightened awareness of who knows what. Of course, this approach will only gain acceptance by users if there is hope that, by collaborating with others, higher-quality knowledge will be produced, and there is also a way to validate the process whereby this knowledge is produced.

One of the collaborative modeling tools is the SIAM modeling tool. The SIAM modeling tool is described by Julie Rosen and Wayne Smith in "Influence Modeling for Strategic Planning: A Structured Approach to Information Operations," *Phalanx*, vol. 33, No. 4, December 2000. SIAM is a decision support tool for collaborative Influence Net (or INET) modeling. INET modeling encourages panelists to create "influence nodes." These influence nodes depict events that are part of cause-effect relationships within the situation under investigation. Panelists also create "influence links" between cause and effect that graphically illustrate the causal relation between the connected pair of events. This cause-effect relationship can be either reinforcing or reversing, as identified by the link "terminator"—an arrowhead or a circle. The resulting graphical illustration is called the Influence Net's "topology." FIG. 1 is an influence network created with the SIAM modeling tool. Each node, such as nodes 100a and 100b, in FIG. 1 is an event and each link, such as link 110, connecting the nodes is an influence link representing the causal relation.

In the past, the SIAM tool was used primarily in face-to-face meetings to enter an INET "coaxed" from panelists by a moderator, one that best represented their consensus view. It would be desirable to enable collaborative construction of INETS by virtual panels, i.e., panels of experts that may be separated in time and space. Additionally, it would be desirable to be able to impose greater scientific rigor on the modeling process by identifying biases amongst panelists, qualifying panelists, deriving valid consensus models, and facilitating incremental improvement in models through further collaboration among panelists based on their level of knowledge and experience.

Consensus-based knowledge validation is useful when there is little time or money to conduct large-scale surveys across a large number of experts or a lack of quantitative data or practical impossibility make it difficult to conduct experiments necessary to produce data. Such an approach may also be necessary to avoid revealing intelligence concerns or targets. In "The 'Emergent' Semantic Web: A Consensus Approach to Deriving Semantic Knowledge on the Web," the authors presented a formal model for deriving consensus from response data measured on a nominal scale, e.g., TRUE/FALSE or multiple-choice. This work did not provide a formal model for deriving consensus from response data measured on ordinal, interval or ratio scales.

Thus, it is an object of the present invention to provide consensus-based knowledge validation and analysis method and system that processes information acquired from human collaborators, representing diverse domains, such as information acquired through the human-machine interface available with the SIAM™ influence network (or INET) modeling tool.

Such a method and system would support the derivation of consensus knowledge from which relevant, credible changes to knowledge corpora are detected, provide metrics to validate the derived knowledge and competency of human collaborators, and route new evidence to those whose assumptions are either supported or challenged by it. Unlike previous approaches that support process-based collaboration, i.e., interactions between experts based on organizational relationships, it would be desirable to leverage knowledge and its distribution among panelists to motivate use of available collaboration tools, i.e., knowledge-based collaboration, and the formation of advice networks. Furthermore, it is desirable to have a system that yields best answers based on responses of experts weighted by their respective competencies.

Furthermore, it would be desirable to provide such consensus analysis services through the Internet or virtual private network ("VPN") as a Web Service ("WS'). Coupled with XML schemas for data input such services would be available to a wide variety of information analysis and modeling tools, even those that run on different software and hardware platforms. Furthermore, it would be desirable to provide for Java-based clients, validations and analysis results as Java objects.

It is unreasonable to assume that the same input data model would satisfy the data processing requirements of all possible modeling tools. At the same time, support for new modeling tools should not disrupt use of the method or require existing tools to change the way users access and use the knowledge validation service. Moreover, with the wide availability of computer-based collaboration tools that exists today, the method of the present invention does not seek to implement its own collaboration tools. Most groups already have collaboration tools that their members prefer or are required to use by policy. Since these tools are often designed or tailored to meet specific requirements of collaboration groups, it is unreasonable, and even unproductive, to impose an additional set of generic tools on collaborators. Ideally, the consensus-based knowledge validation and analysis tool should provide a collaboration interface through which users can easily access consensus analysis results and engage in collaboration on an as-needed basis using all (or any) of the existing collaboration tools in their IT environment. As the consensus-based knowledge validation and analysis tool cannot (or should not) have any prior knowledge of collaboration groups or their IT environments, this means that its collaboration interface should be able to dynamically discover what tools are deployed, then make them available to local users It is desirable for such a knowledge-based model for collaboration to generate at least three supporting metrics: (1) a measure of the overall saliency of the knowledge domain to domain experts, a.k.a., subject matter experts (SMEs), (2) the level of domain expertise or "competence" for each SME with whom one might interact, and (3) the most probable set of "correct answers," derived from the responses of each SME, i.e., the consensus view.

A single set of these metrics of a knowledge model gives a snapshot of knowledge distribution among subject matter experts (SMEs). It is also desirable to monitor, over time, the progress of consensus and knowledge building in the same group of SMEs. Thus, the consensus-based knowledge validation and analysis method and system should allow for analyzing a time series of knowledge models and generating visualizations and supporting metrics, which should include at least: (1) a measure of the overall knowledge variability amongst SMEs, (2) a measure of change in each SME's knowledge relative to peers from one period to the next, and (3) a measure of concordance from one knowledge model to the next.

The computer-implemented services should be scalable and extensible to a wide variety of collaborative modeling tools without requiring extensive customization, development and management overhead. Additionally, the consensus-based knowledge validation and analysis tool should easily and transparently integrate with collaboration tools that are locally available.

BRIEF SUMMARY OF THE INVENTION

The present invention provides a system and method for providing a consensus-based knowledge validation and analysis service that uses a set of response data from a panel of experts created with one or more client tools such as SIAM. The consensus-based knowledge validation and analysis system and service provides a way to increase use of collaboration tools among panels of experts by providing a means for analyzing and validating the responses of such experts to a set of questions. The system or service uses a set of response data created with one or more client tools such as SIAM and formatted in accordance with a data model as input. The response data set is used to estimate statistically a similarities matrix indicative of the amount of agreement in the responses on all items between the panelists. The similarities matrix is used to determine the saliency of the subject matter to the panel of experts and to estimate the competency of each panelist. A consensus model of correct answers is based on the estimated competency of panelists and their responses to items, yielding a response data set. This consensus model is used to generate a knowledge map to aid visualization of the consensus data and encourage further collaboration and consensus building. The method is implemented in a web-based system that enables users of collaboration tools to send response data sets to the knowledge validation and analysis system via the Internet or virtual private network and to likewise retrieve knowledge maps, panelist information and consensus data. An interactive feature enables panelists to communicate with each other through a collaboration tool such as instant messaging that is launched directly from the knowledge map.

One output of the present method and system is a Schemer knowledge object (SKO). An SKO is generated as result of request for consensus analysis by the user of a client tool (such as SIAM). SKOs are sent to client tools on request and dynamically bind to communication and collaboration tools available on client hosts. They also enable an expert to initiate or schedule collaboration with other experts, who may be distributed over distance and time, via a graphical representation of derived knowledge and panelist competencies. In this manner, SKOs play the critical role of a broker between information analysis/modeling tools and collaboration tools.

DETAILED DESCRIPTION OF THE INVENTION

Figure 1:
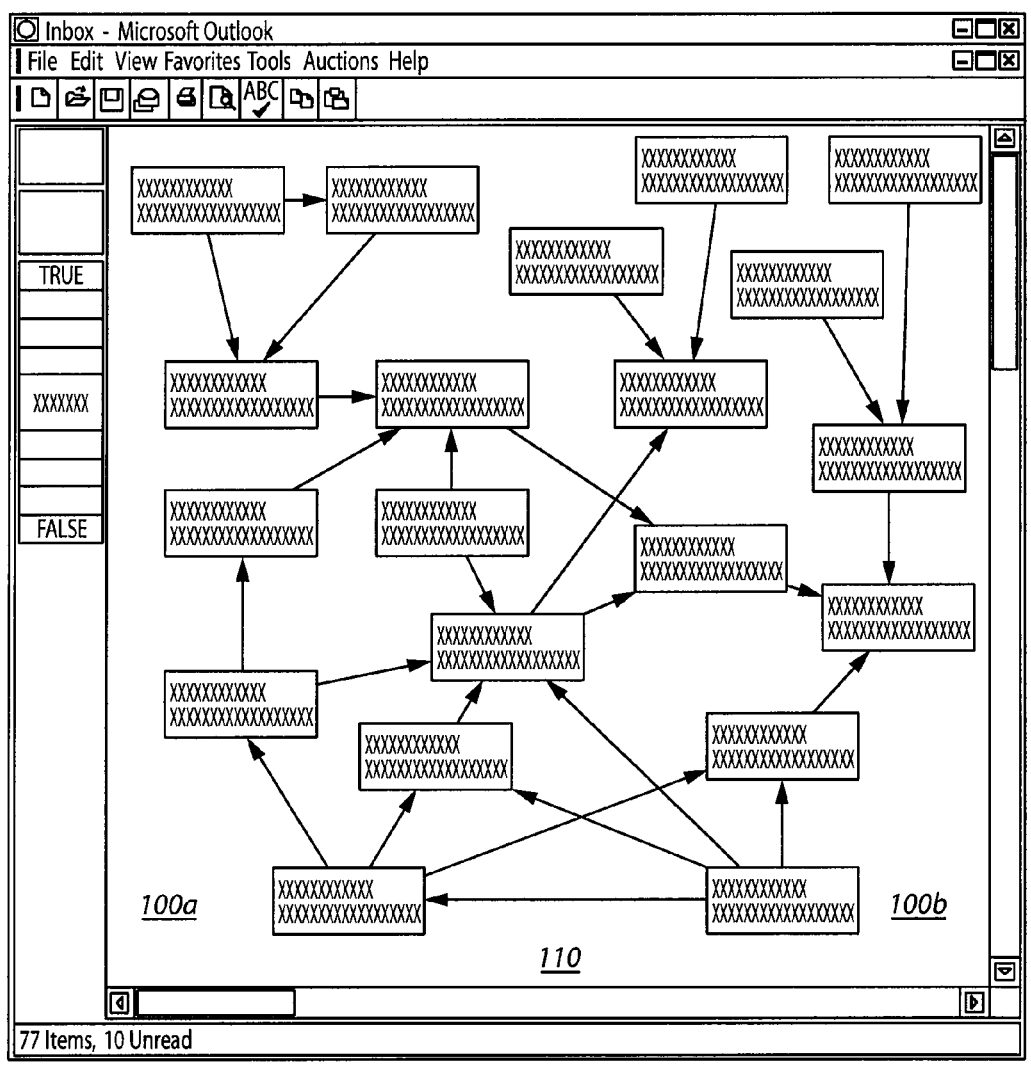
FIG. 1 is depicts an influence network created with the prior art SIAM influence network modeling tool.
Figure 2:
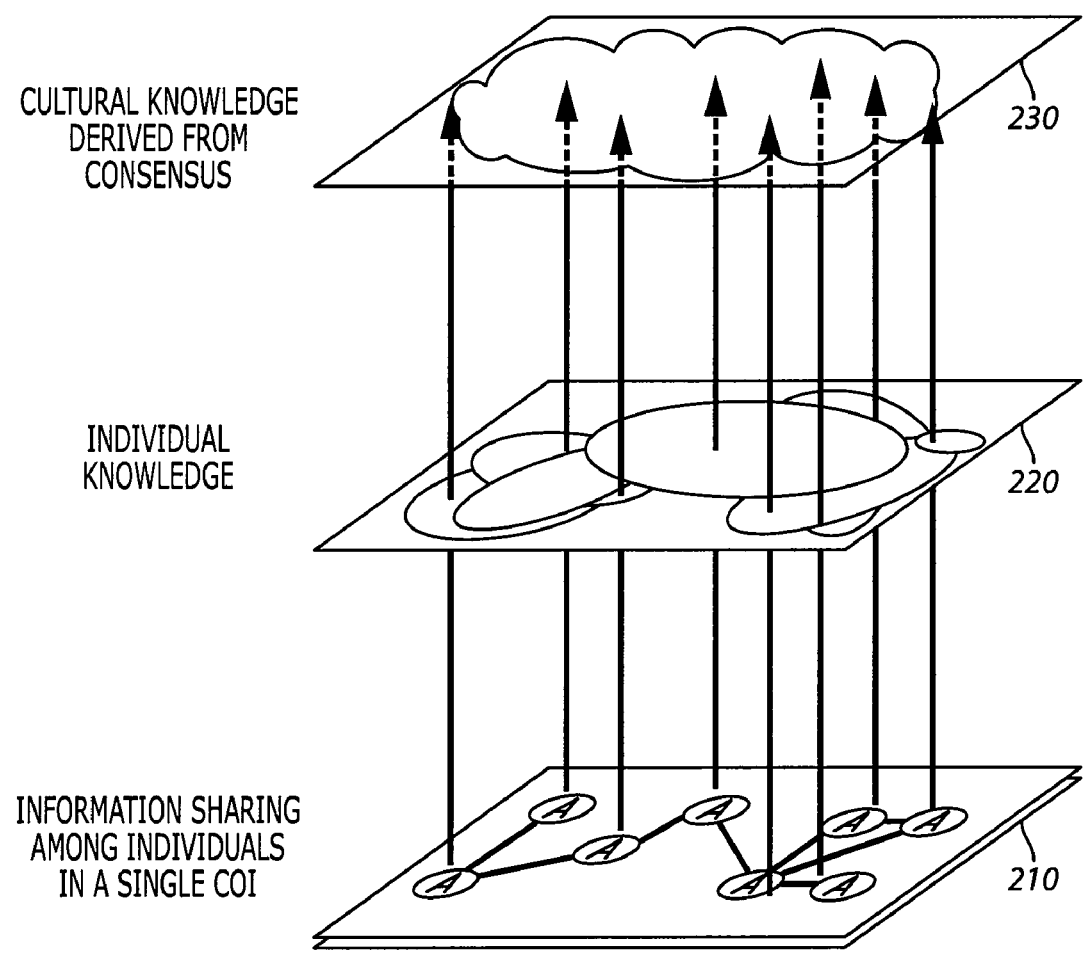
FIG. 2 is a diagram depicting the information shared among individuals and the knowledge derived from consensus.

The system and method of the present invention are built around consensus analysis. Consensus analysis is based on a few simple, but powerful, ideas, i.e., knowledge is both distributed and shared. For any knowledge domain, and any group of subject matter experts ("SMEs") in this domain, these SMEs possess different experiences; hence, they know different things, and some of them know more than others. FIG. 2 depicts the sharing of information among individuals and the "cultural knowledge" derived from consensus. Information sharing, e.g., among individuals A-H in layer 210 of FIG. 2, facilitates the availability of a much larger pool of information with non-uniform distribution of knowledge across members of the same community of interest. Along with the differential expertise one typically finds among members of a community of interest, there also exists some knowledge that is widely-shared and recognized as being "essential." In fact, this knowledge may be so fundamental and its use so widespread that, over time, it becomes logically well-structured or canonical. This core knowledge is not all that one knows (e.g., the set of knowledge for each individual represented in layer 220 of FIG. 2); nor is it the sum total of what everybody knows (e.g., the union of individual knowledge sets in layer 220). Rather, it is an abstraction, knowledge shared in its "broad design and deeper principles" by members of a community of interest. In other words, while its entire details are not usually known (or cannot always be articulated explicitly) by anyone, core knowledge in layer 230 consists of those things that all members of a community of interest understand all others hold to be true. This conceptual framework provides the rationale for consensus analysis: consensus is an indicator of core knowledge.

Before this framework can be applied to provide knowledge validation and consensus modeling services to collaborative modeling efforts such as SIAM INET panels, it is important to place these panels within the larger context of communities of interest. Communities of interest consist of members who, at a fundamental level, share domain theories, vocabulary and semantics. An assumption of consensus analysis is that panelists are drawn from a single community of interest, but this must be confirmed as part of knowledge validation. Because "expert" panelists in particular bring with them the biases of their respective community of interest, it is important to the process of deriving consensus to identify these biases early on. When significant biases are discovered amongst panelists a decision must be made to take action to either mitigate differences between them, or form new panels along the lines of different communities of interest represented on the panel. Consequently, a rigorous methodology capable of supporting knowledge validation and qualification of panelists with metrics is required.

In order to provide knowledge validation and analysis services across a wide variety of collaborative modeling tools, the input data model has been kept simple. It is based on the idea that: (i) instrument data types really only differ in terms of fundamental psychometric measurement scales, i.e., nominal, ordinal, interval and ratio; and (ii) consensus is derived from panelists' responses to any list of uniquely identified ("IDed") items. In this sense, a SIAM INET can be seen as an instrument or form containing slots for a panelist's answers. In a SIAM INET these answers may be of three types, all measured on ratio scale: baseline beliefs for nodes (having values 0 to 1), and true strength influences and false strength influences for each link (with values −1 to +1). Distinctions by measurement scale are crucial for selecting appropriate statistical algorithms for deriving consensus from a set of response data. Other collaborative modeling tools may use other data types and formats.

Figure 3:
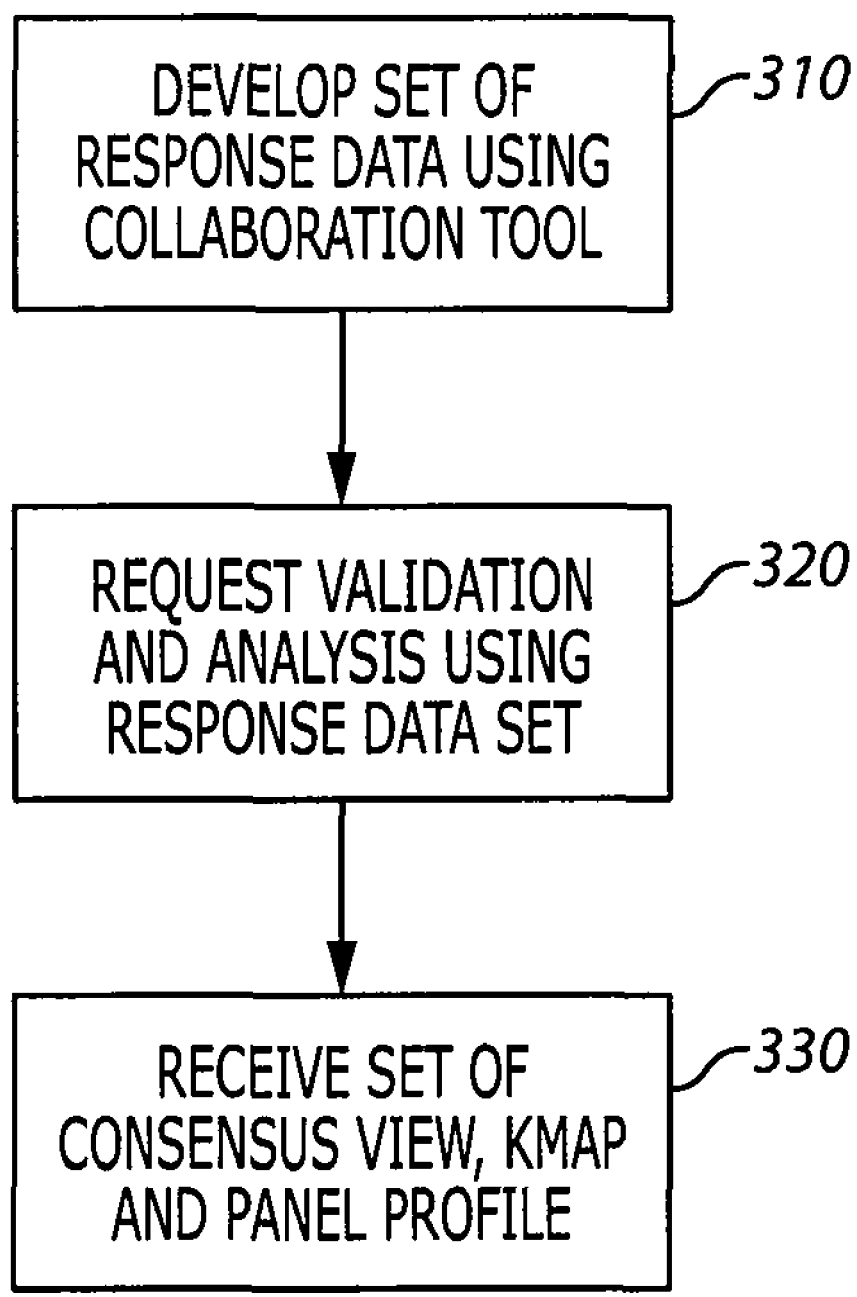
FIG. 3 is a flow diagram depicting the steps a user performs to implement the consensus-based knowledge validation and analysis method and system of the present invention.

The basic steps for a user implementing the present invention are set forth in FIG. 3 and comprise the steps of: (i) developing a set of response data from a panel of experts using a collaborative modeling tool at step 310; (ii) requesting the consensus-based knowledge validation and analysis of the response data set using the tool described herein (also referred to herein as "Schemer") at step 320; and (iii) receiving the output of the tool as a consensus model, knowledge map ("KMap") and a panel profile at step 330. One tool for developing the set of response data is the SIAM collaborative modeling tool. The SIAM collaborative modeling tool is used by human experts to create a set of individual INET models containing node-link structures and parameters describing their knowledge.

Figure 4:
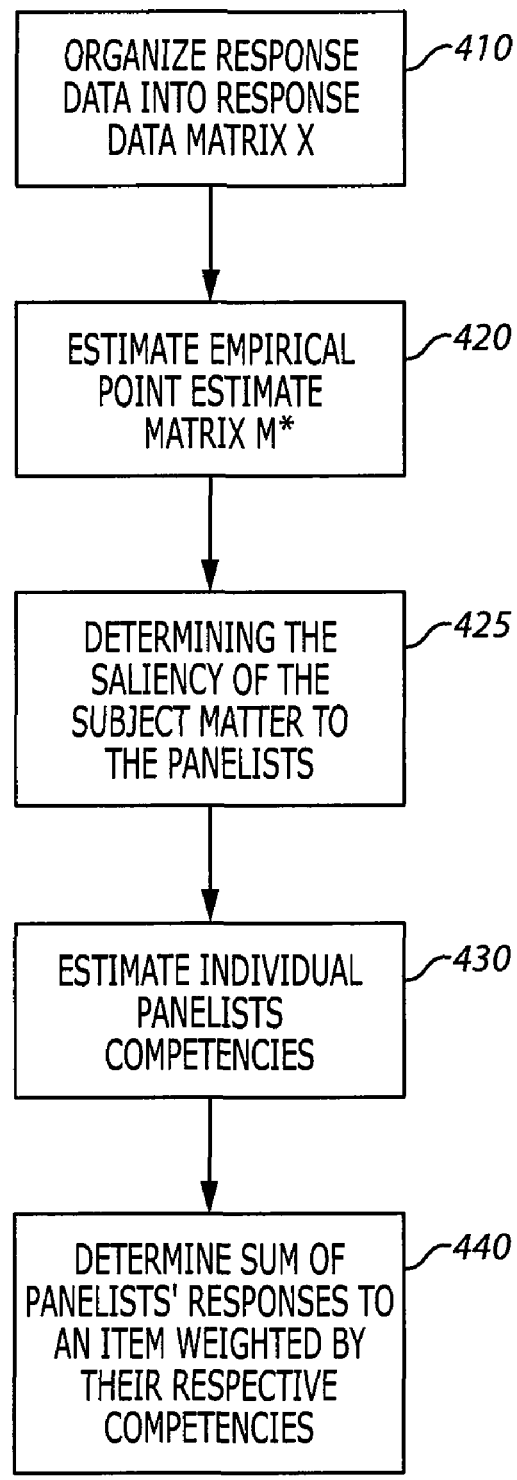
FIG. 4 is a flow diagram depicting the method implemented in the consensus-based knowledge validation and analysis system of the present invention.

The following algorithms are implemented in the software embodied in the knowledge validation and software analysis system used in step 320 above. FIG. 4 sets forth the steps of the method implemented in the software. At step 410 the response data collected by a collaborative modeling tool or tools such as the SIAM tool is organized into a formal model having a response data matrix X containing the responses $X_{ik}$ of panelists 1 . . . i . . . N on items 1 . . . k . . . M. At step 420 matrix M* is estimated and it holds the empirical point estimates $M_{ij}$*, i.e., the amount of agreement in the responses on all items between panelists i and j (with $M_{ij}$*=$M_{ji}$* for all pairs of SMEs i and j). For the SIAM INET data (or any instrument with panelists' responses measured on an interval or ratio scale), the $M_{ij}$* entries are concordance correlation coefficients given by:

$$\hat{\rho}_c = \frac{2rs_xs_y}{s_x^2 + s_y^2 + (\bar{x} - \bar{y})^2} \quad (1)$$

In equation (1), $s_x$, and $s_y$ are the variances in the response sets of panelists' x and y, respectively, $\bar{x}$ and $\bar{y}$ are their mean response values, and r is the Pearson product moment correlation between their response sets. This index has an advantage over the simple Pearson correlation coefficient because it corrects for relative bias and precision. Different similarity measures must be used for nominal and ordinal scale response data.

To obtain the individual panelist competencies, $D_i$*, in other words, an estimate of the proportion of answers panelist i "actually" knows and the main diagonal entries of M*, a solution to the following system of equations is sought $$M^* = D^* D^{*\prime} \quad (2)$$

In equation (2), D* is a column vector containing estimates of individual competencies $D_1 \ldots D_i \ldots D_N$ and $D^{*\prime}$ is merely its transpose. Because equation (2) represents an over-specified set of equations and because of sampling variability, an exact solution is unlikely. However, an approximate solution yielding a determination of the saliency of the subject domain to the panel and estimates of the individual panelist competencies (the $D_i^*$) can be obtained at steps 425 and 430 respectively by applying Maximum Likelihood Factor Analysis to fit equation (2) and solve for the main diagonal values. The relative magnitude of eigenvalues (the first eigenvalue $\lambda_1$ at least three times greater than the second) is used to determine whether a single factor solution was extracted. All values of the first eigenvector, $v_1$, should also range between 0 and 1. Exceptions to these criteria suggest that a panel may actually consist of subgroups that introduce significant and detectable biases to the study.

If the criteria above are satisfied, i.e., it has been determined that the subject domain is salient to the panelists, then the individual panelist competencies can be estimated with $$D_i^* = v_{1i} \sqrt{\lambda_1} \quad (3)$$

The $D_i^*$, then, are the loadings for all panelists on the first factor. These estimates are required to complete the analysis, i.e., to infer the "best" answers to the items. The estimated competency values ($D_i^*$) and the profile of responses for item $k(X_{ik})$ are used to compute the consensus model containing the "correct" answers.

To combine the expert opinions in these continuous SIAM INET data, a weighted average is used at step 440:

$$X_k^c = \sum_{i=1}^{N} x_{ik} D_i^* \Big/ \sum_{i=1}^{N} D_i^* \quad (4)$$

Depending on the measurement scale, different known formulas are used to compute the weighted consensus model. For example, the weighted response data in the nominal scale can be computed using the techniques found in "The 'Emergent Semantic Web: A Consensus Approach to Deriving Semantic Knowledge on the Web," by Clifford Behrens and Vipul Kashyap, published in Real World Semantic Web Applications. Frontiers in Artificial Intelligence Applications, pp. 69-90, Amsterdam: IAO Press, 2002, which is hereby incorporated by reference.

In equation (4) $X_k^c$ is the consensus or "correct" answer to item k, $x_{ik}$ is the response to item k by panelist i, and $D_i^*$ is the estimate of panelist i's competency. Again, it should be mentioned that the "correctness" of an answer is relative to the perspective shared by members of a particular community of interest, i.e., the one represented by panelists. Equations 1-4 are algorithms implemented in software as part of consensus based knowledge validation and analysis system of the present invention. Competency estimates for panelists are used to create the competency contours in the KMap. Alternatively, for response data measured on a nominal or ordinal scale, the estimated competency values ($D_i^*$) and the profile of responses for item $k(X_{ik})$ are used to compute the consensus model containing the "correct" answer using Bayesian a posteriori probabilities for each possible answer. The formula for the probability that an answer is best or "correct" one can be based on the following equation (5):

$$Pr(<Xik>i = 1 \mid Zk = l) = \prod_{i=1}^{N} [D*i + (1-D*i)/L]^{Xik,l} [(1-D*i)(L-1)/L]^{1\,Xik,l} \quad (5)$$

The data model of the present invention is an information model that precisely defines the schema (type and structure) for response data submitted by collaborative modeling tools to the present invention for consensus analysis and knowledge validation. To support a wide variety of collaborative modeling tools, this data model is based on the assumption that (1) tools differ only in terms of the fundamental psychometric measurement scales they employ to collect data, and (2) consensus is derived from a set of responses, made by a group of panelists, to an ordered list of questions (or items). In the data model, of the present invention forms adopted by collaborative modeling tools for collecting panelists' inputs, which differ in their measurement scales, are called instrument types.

For any response data set, the method of the present invention requires that each panelist and item be assigned a unique identifier and each tuple of (panelist id, item id) should be unique, i.e., a panelist cannot have more than one response to the same item. Furthermore, the response set should be complete in the sense that all panelists should have responses to all items.

Figure 5:
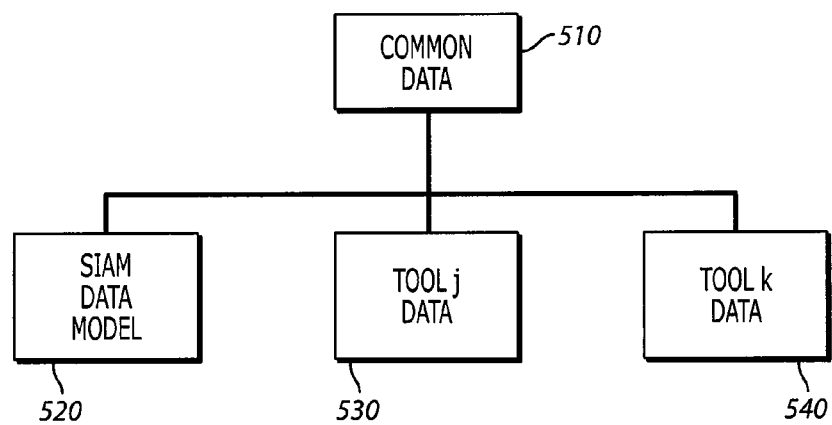
FIG. 5 is a diagram depicting the data model used by the consensus-based knowledge validation and analysis system and method of the present invention.

To address the scalability requirement, the data model used in the present invention is a hierarchical data model, which is graphically illustrated in FIG. 5. This model includes a common data model 510 that defines all data elements and their structure, required for consensus analysis where users have generated data using the SIAM collaborative modeling tool 520 or other collaborative modeling tools, j 530 or k, 540. As the name implies, the information in this data model is common to all the collaborative modeling tools, regardless of their instrument types, and includes instrument metadata, e.g., instrument type name, domain name, and an ordered list of item identifiers, and panel metadata, e.g., panel name and an ordered list of panelist identifiers. It also defines a data structure for storing values of panelists' responses to instrument items.

By encapsulating instrument-specific information into the data model, the hierarchical data model greatly facilitates the use of new collaborative modeling tools on an as-needed basis without introducing any side effect on existing tools. This property of built-in inheritance also minimizes the effort needed to create and support new data models for specific instrument types. Furthermore, modularity inherent in the hierarchical model leads to a modular architecture, in which individual instrument "adapter" components can be built and deployed incrementally without introducing undue downtime in the web-based service.

The present invention exploits a platform-independent mechanism for data transfer so that it can interoperate with diverse collaborative modeling tools, and on a wide variety of operations platforms. Hence, any collaborative modeling tool should be able to submit response data to the web-based service, regardless of the platform on which it is running. For this purpose, XML Schemas are used to implement the hierarchical data model of the present invention. Specifically, the "redefine" mechanism is extensively used to define instrument-specific schemas by adapting generic XML elements defined in the common schema to specific data types and allowed-value requirements of a particular instrument type.

In addition, the "key" and "keyref" mechanisms are used to specify uniqueness constraints in the common schema. This ensures that every instrument-specific schema specifies the same set of constraints. Furthermore, this enables the system and method of the present invention to delegate the responsibility of validating XML instances of response data to an XML parser. This greatly helps increase robustness by eliminating the need of writing application code to check for uniqueness constraints. The completeness constraint cannot be specified in XML Schemas due to lack of support for cross validation in the current XML Schema specification. Thus the system and method of the present invention validates XML instances of Schemer response data against this constraint once they are validated against the uniqueness constraints by the XML parser.

In a preferred embodiment of the present invention, the system and method is implemented as a web-based service. That is, it provides its service interface in Web Service Definition Language ("WSDL") and communicates with client modeling tools by exchanging Simple Object Access Protocol ("SOAP") messages over Hyper Text Transfer Protocol ("HTTP"). The web-based implementation greatly increases interoperability as it can support any web-based modeling tools, regardless of their implementation and operations platforms. Furthermore, it enables the system to update its service interface without affecting the ongoing operation of existing modeling tools, which means that it can incrementally provide advanced features and capabilities on an as-needed basis.

Figure 6:
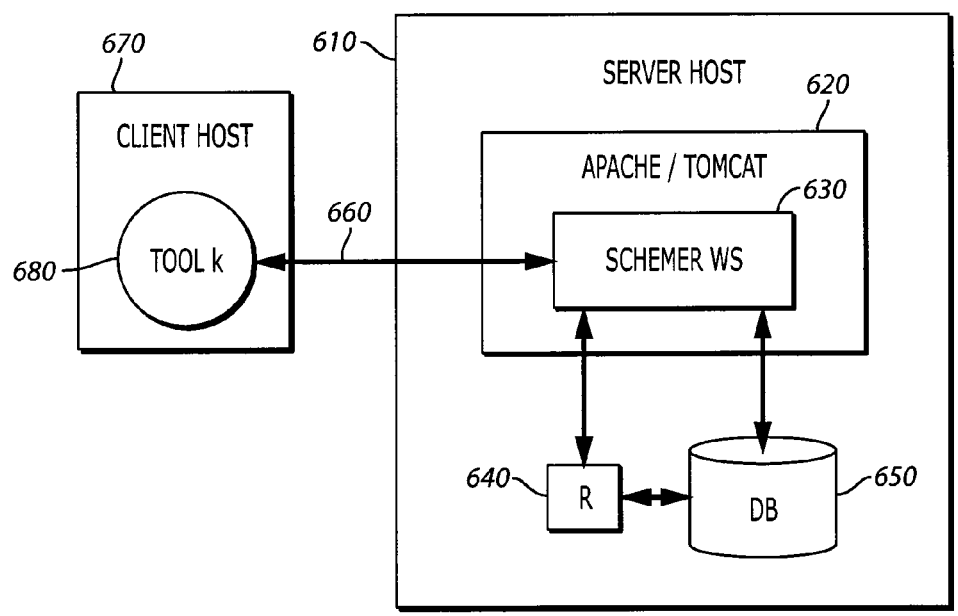
FIG. 6 depicts and architectural overview of an implementation of the system for consensus-based knowledge validation and analysis.

FIG. 6 shows an architectural overview of the web-based implementation of the present invention. The current implementation is based on the Java Web Services Developer Pack (JWSDP). Specifically, the consensus-based knowledge validation system ("Schemer") 630 is implemented as a servlet, which is lifecycle-managed by the Tomcat servlet container 620, included in JWSDP, implemented on server host 610. Server host 610 may be any of a number of central processor based computing systems such as a personal computer ("PC") with the Microsoft Windows operating system or a LINUX-based operating system. The implementation of the tool is not platform specific. The JAX-RPC package, also included in JWSDP, is used to create a WSDL interface and to parse and process SOAP request messages from client modeling tools 680 operating on a client host 670 which may also be a personal computer with a Microsoft Windows, LINUX or other operating system. Client host 670 can communicates with server host 610 through a communication link 660 which could be accomplished through a number of different means. The preferred embodiment is to connect the remote client host 670 to the server host 610 through the Internet or virtual private network ("VPN") although other types of connections are known and possible.

To perform consensus analysis, the consensus-based knowledge validation system 630 uses the well-known and widely-deployed R statistical and graphics environment 640 implemented on server host 610 although other statistical programming environments may used. Specifically, the Schemer system 630 comprises a set of scripts that implements the consensus analysis and knowledge validation methods in the R language. The scripts are executed to derive a consensus model and panelist competencies for each valid response data set received from client modeling tools. The results of each execution of the script are asynchronously stored in an internal database 650 and sent to these client tools, through a process described below.

The WSDL interface of the consensus-based knowledge validation system is designed to support asynchronous interaction, where client tools make separate requests to submit response data for consensus analysis and then to retrieve analysis results. For each request to perform consensus analysis, the consensus-based knowledge validation tool returns a "token" that acknowledges the receipt of the request to the client tool as quickly as possible, without completing analysis on the submitted response data. In turn, the client uses this 'token' in its subsequent request(s) to retrieve analysis results. This way, client tools get to learn the status of their "perform" requests without significant delay, which is critical in any environment that involves interaction with end users. Furthermore, this design greatly increases the availability of the consensus-based knowledge validation system by maximizing throughput of its "perform" requests.

In a synchronous design, where the consensus-based knowledge validation system processes a "perform" request to completion and returns results before processing other requests, the service essentially becomes unavailable to other client tools while processing a "perform" request from a single client tool. The "downtime" is unpredictable and can be significant, depending on the number of client tools that compete for the service at the same time, limiting both the availability and usability of the system.

A "perform" request includes an XML instance (or document) of input response data and instrument type information. Upon receiving a "perform" request, the consensus-based knowledge validation system first validates the XML instance against an appropriate schema based on the instrument type information. If valid, it goes on to create a globally unique identifier for the current request, reserves placeholders for analysis results in the database, and notifies a separate R execution thread of the current request. This thread is responsible for executing the aforementioned R script for consensus analysis and storing analysis results for each "perform" request. The notification of the current request includes its validated response data, request identifier, placeholder locations in the database, and instrument type information. Immediately after notifying the R execution thread, the consensus-based knowledge validation system returns the request identifier to the requesting client modeling tool. If the XML document in the "perform" request is invalid, the consensus-based knowledge validation tool immediately returns NULL.

A client tool 680 at a client host 670 makes a "retrieve" request to retrieve consensus analysis results for a previous "perform" request. The "retrieve" request includes the same request identifier as the one returned by the corresponding "perform" request. Note that the client tool making the "retrieve" request does not have to be the same one that has made the "perform" request. Also, client tools can make multiple "retrieve" requests with the same request identifier. This allows for flexible usage scenarios. For example, if a collaborative modeling tool has a client-server architecture, it can implement a policy in which the server makes a "perform" request and distributes the returned request identifier to the clients, say by email, instant messaging, or any other method. Then each client can make a "retrieve" request at different times (and at the convenience of the local user).

Upon receiving a "retrieve" request, the consensus-based knowledge validation system 630 uses the input request identifier as a key to search its database for the placeholders that (should) have been created as part of processing the corresponding "perform" request. If no placeholders are found, this means that the input request identifier is invalid, and the consensus-based knowledge validation system immediately returns NULL. If the placeholders are found but empty, it means that the R execution thread has not yet completed processing the "perform" request, and the consensus-based knowledge validation system returns NOT READY. If the placeholders are found and populated, it means that the R execution thread has completed processing the "perform" request. In this case, the consensus-based knowledge validation system retrieves the analysis results, stored by the R execution thread, from the placeholders and returns them to the requesting client. Analysis results are encapsulated in Schemer Knowledge Objects (SKOs). In the preferred embodiment of the present invention, an SKO is implemented as an XML document with a predefined XML schema. This way, any client, regardless of its implementation platform, can receive, parse, and display the consensus analysis results in an SKO on the host screen. The preferred embodiment of the present invention also provides a set of Java code, called SKO Wrapper, for parsing and displaying consensus results in SKOs to expedite the process of integrating SKOs in Java-based clients. SKO Wrapper also includes Java code for binding to collaboration tools available on client hosts and graphical user interface (GUI) code for allowing users to selectively view consensus analysis results and interact with other users via locally-bound collaboration tools. In another embodiment of the present invention, SKOs are implemented as Java objects, which include not only consensus analysis results but also code of the SKO Wrapper. The present invention for the consensus-based knowledge validation system returns an SKO to client tools in response to "retrieve" requests.

For any valid response data set, consensus analysis results include a panelist profile that provides competency measurements for panelists and a knowledge domain profile that includes the consensus values computed for an instrument. In addition, a knowledge map (KMap) is included, which is a contour image that graphically displays relative distances of the panelists in terms of their estimated competencies and relative differences in their domain knowledge as depicted in Kmap window 720 in FIG. 7. The exact coordinates of the panelists plotted on this image are obtained through a multi-dimensional scaling (MDS) of the agreement matrix (M*). The typical image resembles a "fried egg," with the most knowledgeable panelists in the center or "yolk" of the egg, and the least knowledgeable panelists plotted towards the edges or "white" of the egg. The closer two panelists are on this image, the more similar they are in the knowledge they possess; conversely, those panelists plotted most distant from one another have the most different perspectives. In addition, competency contour lines are overlaid on this image to provide references for groups of panelists possessing equivalent knowledge, and a legend is also provided for more detailed visual interpretation of the plot. Again, these competencies are merely estimates of the degree to which a panelist's knowledge contributes to the consensus view and is related to the probability that he or she would correctly answer any question drawn from the same knowledge domain.

Figure 7:
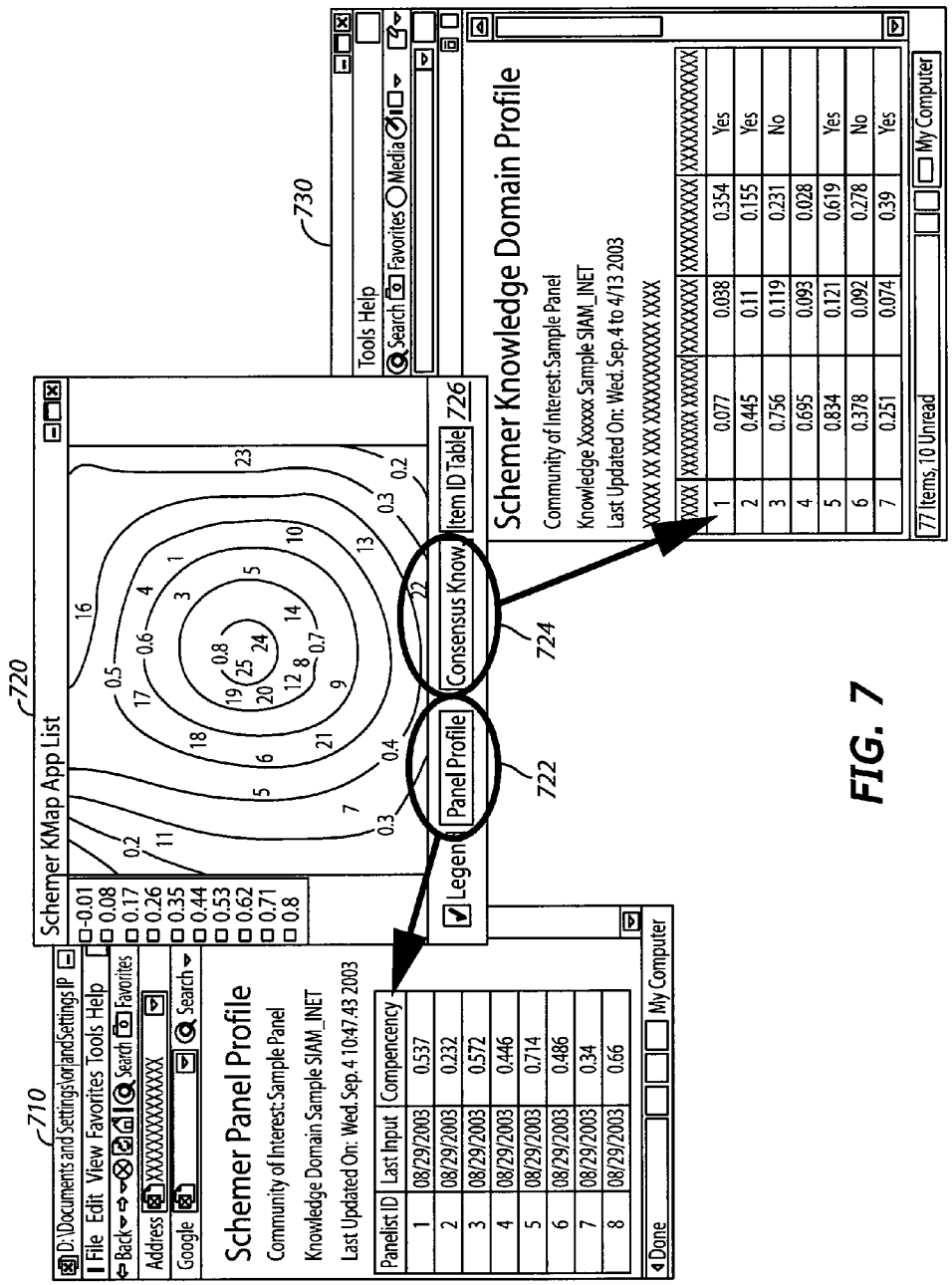
FIG. 7 depicts the user interface and output of the consensus-based knowledge validation and analysis system.
Figure 8:
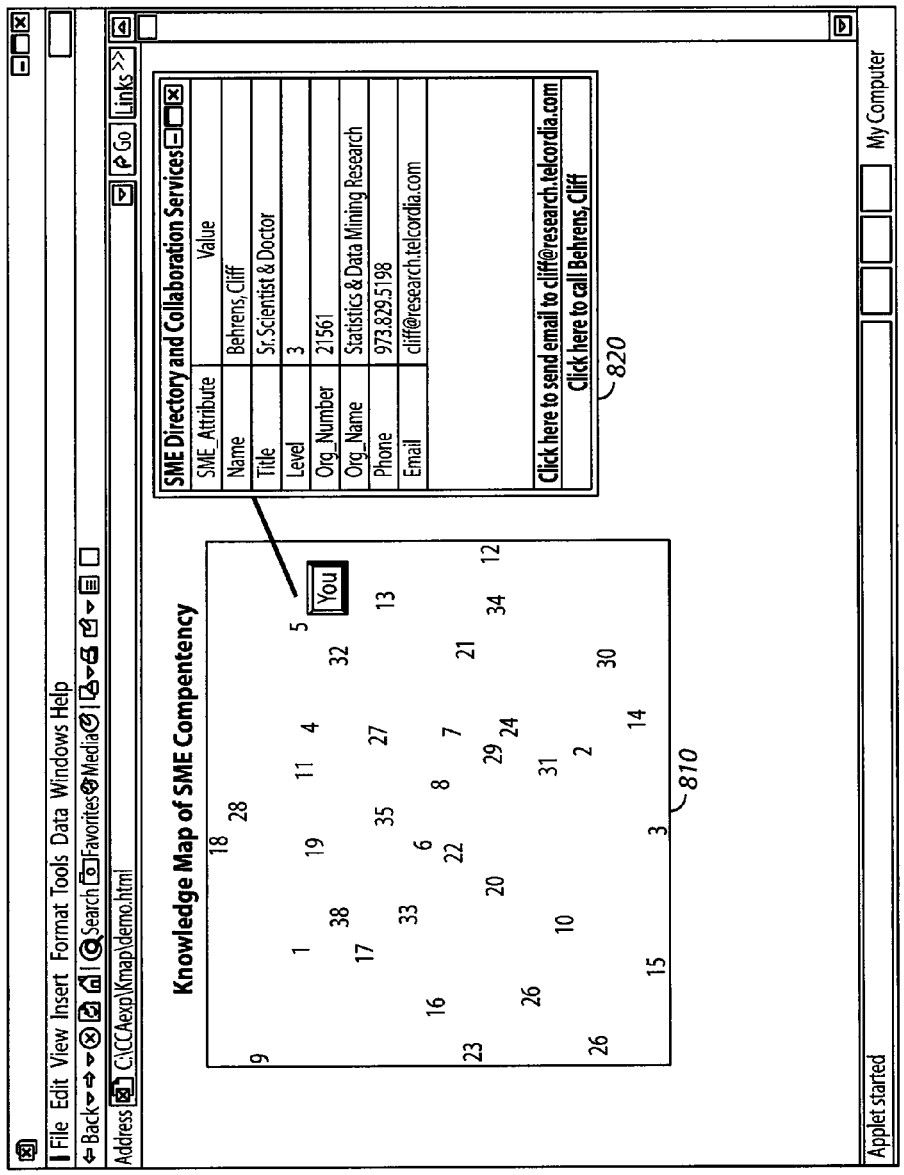
FIG. 8 depicts the knowledge map output of the consensus-based knowledge validation and analysis system and method of the present invention.

FIG. 8 shows the Kmap window 810 of an example SKO. This window displays the Kmap image of panelist competencies. The panelists are represented on this image with identifiers assigned by the consensus-based knowledge validation tool. Right-clicking on one of these identifiers reveals the "real" panelist identifier as specified in the Schemer response data set and set forth in display window 820. Depending on his or her role in the panel, the local panelist may be provided or denied access to the results of the entire analysis including the identities of other panelists. The Kmap window also provides an interface through which the local user can display statistical results in the form of panel and knowledge domain profiles. Internally, each profile is represented as an XML document that conforms to the XML schema definition of the consensus-based knowledge validation tool. The panel profile can be retrieved by clicking on the 'panel profile" button 722 in the graphical user interface in FIG. 7. FIG. 7 shows a typical instance of a panel profile 710. The panel profile contains the competency estimates for all panelists, and the knowledge domain profile gives the knowledge validation metric (the ratio of the first two eigenvalues, as characterized above, the consensus knowledge model and other statistics useful for assessing the importance of certain items for consensus derivation and knowledge validation. These include a "best" subset of items for measuring overall competency in a knowledge domain, useful for qualifying potential panelists.

A 'Consensus Knowledge" button 724 is used to retrieve information regarding the consensus answer value, difficulty measurement, and other statistical measurements for each item as depicted in Schemer Knowledge Domain Profile 730 in FIG. 7. Depending on the measurement scale of the response data, these other statistics may include correlations between the set of panelists' responses for an item and their set of competencies. Together, item difficulty and the performance validation metrics may be used to select the "best" set of items for selecting other experts for a panel The "Item ID Table" button 726 in FIG. 7 is used to retrieve a mapping of item ids in the consensus-based knowledge validation and analysis tool to instrument item ids.

The objects returned by the consensus-based knowledge validation system, particularly the knowledge map (KMAP), are crucial to the notion of knowledge-based collaboration. FIG. 8 depicts a knowledge map (KMAP) 810 resulting from the method and system of the present invention. Using the right-click of the standard personal computer 'mouse' the user can retrieve information on the corresponding panel (or SME) identified and a menu of collaboration tools 820. By giving panelists greater insight into the manner in which knowledge is distributed among themselves, the consensus-based knowledge validation system motivates further collaboration and the formation of advice networks. For example, a panelist with a question might seek an answer from another panelist who seems to be more knowledgeable, but not necessarily one of the so-called "gurus," thus reducing the demand on the most knowledgeable individuals on the panel. One might also wish to use information about other panelists represented on the map to determine those whose perspective seems most different from their own, then initiate further collaboration in attempt to resolve or explain these differences. The map might also reveal novel thinkers, those plotted apart from others or with negative competency estimates, with whom one might want to further collaborate to determine whether these individuals have new knowledge or insights that would benefit others on the panel. The map and knowledge saliency metric can also detect the existence of strong biases within a panel. This might be revealed by the display of more than one "fried egg" in the knowledge contour map or by a small value (<3) for knowledge saliency. Any of these insights gained from information provided by the SKO object could promote collaboration and contribute towards evolving consensus.

The present invention encourages knowledge-based collaboration as follows. To discover collaboration tools that are locally available and used by panelists, the SKO (or SKO Wrapper if the SKO is implemented as an XML document) requires a client modeling tool to provide a Java object that implements a Java interface, called KmapClient, defined by the preferred embodiment of the present invention. This interface defines a set of Java methods that the SKO can invoke to query for the names of available collaboration tools and to make a request to initiate collaboration with a certain user of the named tool. The advantage of having individual modeling tools to implement the KmapClient interface is two-fold. First, since each modeling tool has the first-hand knowledge of what collaboration tools are being provided to its panelists, the collaboration tools made accessible through the SKO can be exactly the same as those currently in use. This eliminates the need for users to learn and use new tools when collaborating through the interface of the Kmap window, as described shortly. Second, the SKO can discover locally available collaboration tools in a consistent and tool independent manner, which greatly increases its interoperability with a wide variety of tools.

Figure 9:
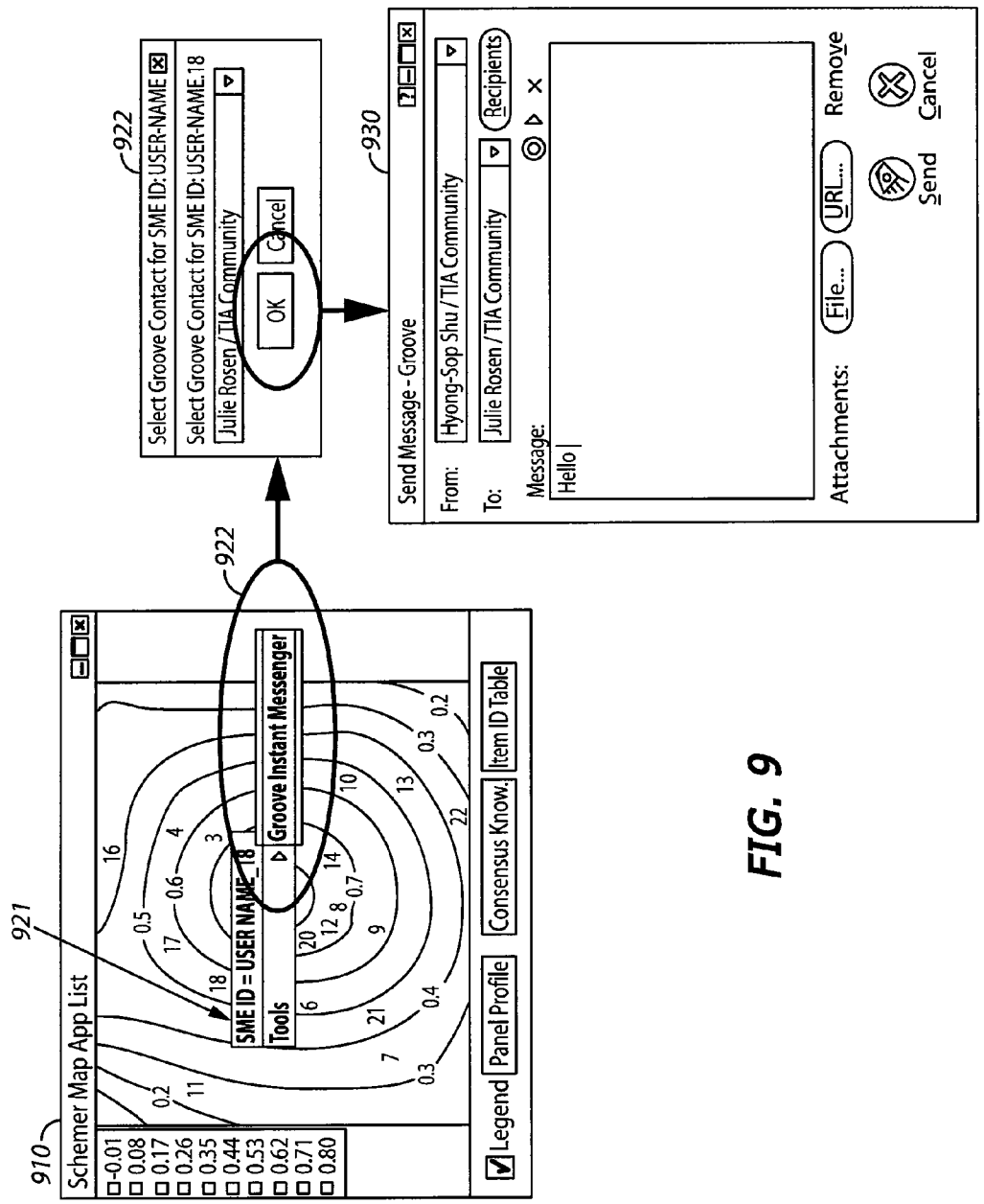
FIG. 9 depicts the user interface providing access to existing communication tools for use by panelists.

As described, the Groove tool is used to provide a suite of collaboration tools to users. In one embodiment of the present invention a KmapClient object has been designed to integrate with Groove collaboration tools as depicted in FIG. 9. Specifically, this object implements the KmapClient interface on one hand and some application logic to invoke Groove tools per user request on the other. The KmapClient object uses Groove Web Services in order to initiate individual Groove tools.

The SKO (or SKO Wrapper in case the SKO is implemented as an XML document) makes locally available collaboration tools accessible on the Kmap window as follows. As shown in FIG. 9 when the user right-clicks on a panelist identifier 921 of the Kmap image 910, a pop-up menu 922 displays the names of those collaboration tools provided by the KmapClient object. When the user clicks on a tool name, the SKO object notifies the KmapClient to start the corresponding tool for the local user and remote user associated with the selected panelist identifier. FIG. 9 graphically illustrates the manner in which a Groove tool for instant messaging is invoked from the Kmap window through pop-up menu 920 and Groove message window 930.

In another embodiment of the present invention, the consensus model, panel profile and associated metrics available as XML documents in the SKO are made accessible through an application programming interface (API) so that client applications can programmatically access specific information contained in the SKO. This allows each client model tool to incorporate and render SKO data in a custom manner that best suits its needs. The API for the present embodiment consists of "public long performConsensusAnalysis (String schemerResponseSet)" wherein the "schemerResponseSet" is an XML document that conforms to a Schemer XML schema and the function returns a unique identifier for referencing results in subsequent messages. The other command is "public KmapWrapper geKnowledgeMap(long kMapID)." The KmapWrapper "wraps" output objects, e.g., knowledge domain profile, panel profile and image of consensus knowledge map. KmapWrapper provides a user interface for communication and collaboration among panelists.

The system and method of the present invention is capable of exception handling and analytical diagnostics. In a first phase of data validation, XML schemas are used to validate input response sets, and the tool checks to make sure that certain data input parameters, e.g., minimum number of panelists and items and uniqueness of panelist identifiers and item identifiers, are met. In a second phase of data validation, the Java algorithms test the data for completeness and identify places where data is missing. Finally, in a third phase of data validation, errors that occur during the statistical processing of the response data set in the R environment are trapped and presented to the user for resolution. Such errors may be due to other "pathologies" in response data sets, e.g., no variability in responses to items, which can cause problems for the statistical algorithms implemented in the present invention.

For response data measured on interval and ratio scales, t more sophisticated methods than weighted averages can be used for deriving consensus models such as simulation approaches to computing distribution-free estimates [By showing more precisely which kinds of knowledge accounts most for these differences and how, through further collaboration, these differences dissolve as a consensus evolves.

Consequently, in an additional embodiment the statistical algorithms have been modified to incorporate data augmentation and imputation techniques that enable the derivation of models from incomplete data thereby enabling the consensus-based knowledge validation tool to always compute a consensus model from the most current data available to one of its clients.

A KMap is useful as a "snapshot" that provides panelists and panel administrators with a current view of knowledge distribution within a panel. This view should motivate panelists to use collaboration tools in their IT environment to exchange ideas and, when appropriate, revise their opinions. This form of knowledge-building, and the role played by collaboration and consensus-building, can actually be monitored by longitudinal analysis of KMaps.

The Schemer system performs longitudinal analysis on a series of KMaps to compute visualizations and metrics useful for assessing the amount of consensus formation and knowledge-building produced by collaboration. However, longitudinal analysis is complicated by the fact that the above described MDS algorithm produces a KMap whose axes orientation and scale is arbitrary. This means that before successive KMaps can be compared, and metrics computed, all KMaps used for longitudinal analysis must be referenced to the same coordinate configuration. Schemer uses the "procrustes" function in the "R" library for this purpose.

"Procrustes" analysis refers to a set of strategies used to "rotate" a matrix to maximum similarity with a target matrix. It is often used to compare ordination results, such as the different point configurations in KMaps computed by the Schemer method and system. In a typical Procrustes rotation, the configurations are re-scaled to a common size and jointly centered, and, if necessary, mirror reflected so that their orientation is coincident. In order to find the optimal superimposition, one configuration is kept fixed as a reference, while the other is rotated successively until the sum-of-the-squared residuals between corresponding coordinates in both configurations is minimized.

Greater concordance between data sets after rotation produces a smaller residual sum of squared differences in Euclidean multivariate space. The present system and method measures this concordance with a correlation-like statistic (Corr) derived from the symmetric Procrustes sum of squares (SS) as Corr=$\sqrt{1-SS}$. As the concordance between plots increases, the value of "Corr" approaches 1.0. The R function protest computes Corr, then conducts a randomization test to estimate its significance (or p-value) by calling the procrustes function repeatedly (1,000 times), keeping track of the proportion of times the value of Corr obtained for the permuted data is greater than or equal to the observed value. Along with the rotated plots and correlation between each rotated plot and its reference configuration, a Compactness metric, measuring the overall knowledge variability amongst panelists, is also reported. Based on intra-configuration standard deviation, it is computed as follows:

$$sdev(X) = \sqrt{\frac{1}{N}\sum_{i=1}^{N} d^2(x_i, \bar{x})} \quad (6)$$

where $d^2(x_i, \bar{x})$ is the squared Euclidean distance between a vector $x_i$ and $\bar{x}$, the centroid of X; and N is the number of points (panelists) in the KMap configuration. The value of the metric Compactness approached zero as the configuration becomes more compact, indicating greater consensus amongst panelists.

Figure 10:
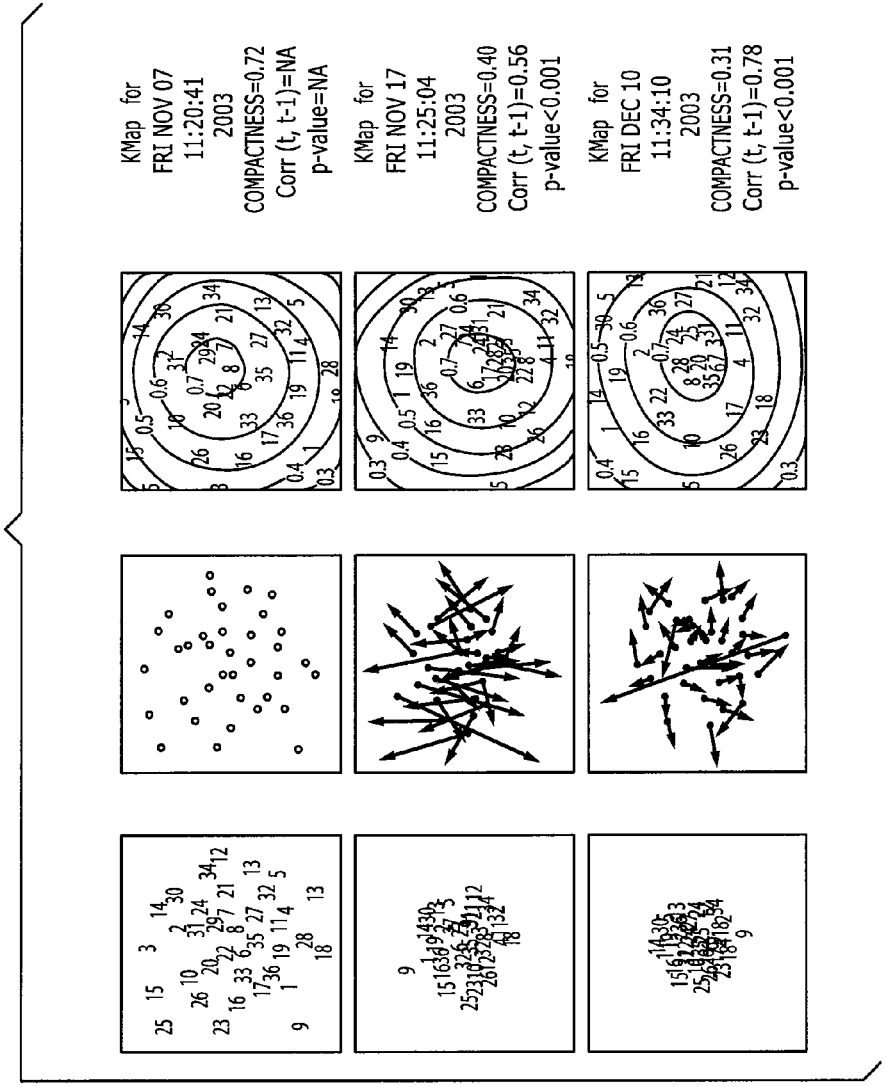
FIG. 10 depicts an example of the results of time series analysis generated by an embodiment of the present invention

FIG. 10 shows an example of time series analysis (also referred to herein as longitudinal analysis) results generated by a preferred embodiment of the present invention. In FIG. 10, each plot in the leftmost column (with the obvious exception of the top one) is rotated using the one above it (from the last time period) as a reference plot. The individual residuals between homologous points are also interpreted separately in the center column of plots. In these plots, the differences between a panelist's current and preceding location are represented by an arrow, with the head of the arrow pointing to his location in the reference configuration, and the length of the arrow proportional to the residual distance between these locations.

The reason for providing all of the visualizations and supporting metrics described above is to foster knowledge-building and intelligence improvement through increased collaboration amongst panelists. By giving panelists greater insight into how knowledge is distributed within a panel, they will be further motivated to share what they know. This includes a heightened awareness of key concepts and the negotiation of their meaning, and growing agreement on first principles and assumptions key to the relevant domain theory. The present invention provides a means for actually monitoring this process. For example, the plots and statistics computed from a longitudinal analysis of KMaps, presented in FIG. 10, indicate a scenario in which collaboration is, indeed, promoting consensus and knowledge-building. As panelists exchange more information and increase their knowledge of the topic domain, they eventually come to share a similar domain theory, and the following pattern emerges. The leftmost column of scatter plots exhibit a single cluster of points, and this cluster of points grows more compact over time, suggesting that panelists are converging on a shared or "consensus" model. This conclusion is further supported by a gradual decrease in the compactness metric over the same time periods. The middle column of plots shows how the knowledge possessed by panelists, with respect to their peers, changes over time. The length of an arrow is directly proportional to the shift in a panelist's position, and the amount of overlap (or "spaghetti") among arrows indicates the amount of uncertainty amongst panelists. The last plot in this series exhibits relative stability with few panelists having shifted much from their previous position. The rightmost column of plots is a replotting of each KMap after Procrustes rotation, if rotation was applied. The trend in this sequence of plots is for a greater concentration of panelists within higher-valued competency contours. The increase in correlation between successive KMaps in the series also confirms growing consensus and panel convergence on a shared domain theory.

The procedure for making a request for time series analysis and retrieving the generated results, which has been realized in the current embodiment of the present invention, is as follows. Referring to FIG. 6, the collaborative modeling tool 680 first makes a request for time series analysis to Schemer WS 630. This request contains a set of request identifiers, each of which corresponds to a prior request for consensus analysis and is referred to as an RI. This request is made by invoking a method defined on the service interface (in WSDL) of Schemer WS 630.

Upon receiving a request for time series analysis, Schemer WS 630 first retrieves previously generated consensus analysis results from its database 650 as per received RIs. Then, Schemer WS 630 starts a thread for executing an R script that implements the time series algorithm (as previously described). The retrieved consensus analysis results are passed in as input parameters to the script. The successful execution of this script results in a PDF document that contains all the time series analysis results and get stored in the database 650. Subsequently, Schemer WS 630 returns a globally unique request identifier, RI-TS, to the client tool 680.

Upon receiving the RI-TS, the client tool 680 can retrieve the results of a time series analysis request as follows. First, it makes a "retrieve" request to Schemer WS 630, passing in the RI-TS. If the R script has successfully completed its execution, Schemer WS 630 returns an HTTP URL to the generated PDF document to the client tool 680, which, in turn, retrieves the document by using a Web browser application on the client host 670. If the R script has failed to execute, the Schemer WS 630 generates an exception to the client tool 680. If the R script has not yet completed its execution, the Schemer WS 630 also generates an exception to the client tool 680, so that it can retry at a later time.

Note that results of a time series analysis are captured in a PDF document in the current embodiment of the present invention. However, other formats or technologies for encapsulating and representing these results are also possible. For example, as with SKO XML documents and SKO Wrapper code, time series analysis results can be represented as XML documents, and corresponding wrapper code may be created that renders these results in the client tool 680 as per individual application requirements.

The above-described embodiments of our invention are intended to be illustrative only. Numerous other embodiments may be devised by those skilled in the art without departing from the spirit and scope of our invention.

The invention claimed is:

1. A tangible computer-readable medium having instructions for comparing a plurality of knowledge maps derived from a consensus model generated from a set of response data collected from a plurality of panelists using a collaborative modeling tool over a period of time stored thereon, the instructions configured to cause a computing device to:
input a first set of response data from the plurality of panelists using a collaborative modeling tool at a first time;
compute a first consensus model from the first set of response data;
develop a first knowledge map from the first consensus model;
input a second set of response data from the plurality of panelists using the collaborative modeling tool at a second time, wherein the second time is different than the first time;
compute a second consensus model from the second set of response data;
develop a second knowledge map from the second consensus model;
perform a procrustes analysis of the second knowledge map against the first knowledge map to generate a realigned second knowledge map;

enable display of the first knowledge map and the realigned second knowledge map.

2. The tangible computer readable medium of claim 1 the instructions further comprising instructions configured to cause a computing device to calculate a compactness metric indicative of the an overall knowledge variability between the plurality of panelists.

3. The tangible computer readable medium of claim 2 wherein the instructions configured to cause a computing device to perform the procrustes analysis further comprises instructions configured to cause a computing device to:
   rotate the coordinates in the second knowledge map;
   calculate a residual sum of the squared differences between the coordinates in Euclidean multivariate space; and
   derive a correlation-like statistic from the residual sum until the correlation-like statistic approaches one.

4. The tangible computer-readable medium of claim 1 the instructions further comprising instructions configured to cause a computing device to:
   enable display of a scatter plot of the first and second knowledge maps; and
   enable display of a plot showing movement of the plurality of panelists between the first knowledge map and second knowledge map.

5. The tangible computer-readable medium of claim 1 the instructions further comprising instructions configured to cause a computing device to:
   enabling the plurality of panelists to communicate by selecting an identifier in the knowledge map, scatter plot, or plot showing movement of the plurality of panelists where the identifier is associated with one of the plurality of panelists.

6. The tangible computer-readable medium of claim 5 wherein the instructions configured to cause a computing device to enable the plurality of panelists to communicate further comprises instructions configured to cause a computing device to present the plurality of panelists with a graphical user interface to one or more collaboration tools when an identifier is selected.

7. A tangible computer-readable medium having instructions stored thereon, the instructions configured to cause a computing device to:
   derive a knowledge map from a set of response data collected from a plurality of panelists in response to a plurality of items regarding a subject matter, the knowledge map comprising a graphical display of a comparison of responses of the plurality of panelists;
   present the knowledge map to one or more of the plurality of panelists;
   enable a first panelist from the plurality of panelists to initiate communication with a second panelist from the plurality of panelists by facilitating a selection of an identifier associated with the second panelist on the knowledge map.

8. The tangible computer-readable medium of claim 7 wherein the instructions configured to cause a computing device to enable further comprises instructions configured to cause a computing device to present the plurality of panelists with a graphical user interface to one or more collaboration tools after the identifier is selected.

9. The tangible computer-readable medium of claim 8 wherein the collaboration tool is an instant messaging system.

10. The tangible computer readable medium of claim 7 wherein the plurality of panelists are at least compared in terms of estimated competencies and relative differences in the domain knowledge of the plurality of panelists.

* * * * *

UNITED STATES PATENT AND TRADEMARK OFFICE
CERTIFICATE OF CORRECTION

PATENT NO.         : 7,970,592 B2                                    Page 1 of 1
APPLICATION NO.    : 12/608537
DATED              : June 28, 2011
INVENTOR(S)        : Behrens et al.

It is certified that error appears in the above-identified patent and that said Letters Patent is hereby corrected as shown below:

Column 17, line 3, in Claim 2, delete "computer readable" and insert -- computer-readable --.

Column 17, line 8, in Claim 3, delete "computer readable" and insert -- computer-readable --.

Column 18, line 29, in Claim 10, delete "computer readable" and insert -- computer-readable --.

Signed and Sealed this
Thirty-first Day of July, 2012

David J. Kappos
*Director of the United States Patent and Trademark Office*